US012738011B2

(12) United States Patent
Huang et al.

(10) Patent No.: US 12,738,011 B2
(45) Date of Patent: Sep. 15, 2026

(54) METHOD AND DEVICE FOR PREDICTING COLLISION TIME BASED ON AN IMAGE

(71) Applicant: Beijing Tusen Zhitu Technology Co., LTD., Beijing (CN)

(72) Inventors: Zehao Huang, Beijing (CN); Xiaolong Cheng, Beijing (CN); Naiyan Wang, Beijing (CN)

(73) Assignee: Beijing Tusen Zhitu Technology Co., LTD. (CN)

( * ) Notice: Subject to any disclaimer, the term of this patent is extended or adjusted under 35 U.S.C. 154(b) by 236 days.

(21) Appl. No.: 18/764,314

(22) Filed: Jul. 4, 2024

(65) Prior Publication Data

US 2025/0014304 A1 Jan. 9, 2025

(30) Foreign Application Priority Data

Jul. 5, 2023 (CN) ......................... 202310822788.3

(51) Int. Cl.
*G06V 10/25* (2022.01)
*G06T 3/40* (2006.01)
*G06V 10/74* (2022.01)

(52) U.S. Cl.
CPC ................ *G06V 10/25* (2022.01); *G06T 3/40* (2013.01); *G06V 10/761* (2022.01)

(58) Field of Classification Search
CPC .... G06V 10/25; G06V 10/761; G06V 10/255; G06V 10/32; G06V 20/58; G06T 3/40; G06T 2207/30261; G06T 7/248; G06T 7/246; G06T 2207/10016; G06T 2207/20104
See application file for complete search history.

(56) References Cited

U.S. PATENT DOCUMENTS

| | | | | |
|---|---|---|---|---|
| 6,862,026 | B2 * | 3/2005 | Zachmann | B25J 9/1664 345/474 |
| 2015/0035685 | A1 * | 2/2015 | Strickland | B60Q 9/008 340/901 |
| 2015/0091740 | A1 * | 4/2015 | Bai | B60W 40/08 340/901 |
| 2022/0028273 | A1 * | 1/2022 | Mell | G08G 1/166 |
| 2023/0166743 | A1 * | 6/2023 | Heck | G06N 3/044 |
| 2024/0354964 | A1 * | 10/2024 | Yanamala | G06V 10/443 |

* cited by examiner

*Primary Examiner* — Jonathan A Boyd

(74) *Attorney, Agent, or Firm* — Genius Patent APC; Bruce Angus Hare

(57) ABSTRACT

The present disclosure provides a method, a computing device and a storage medium. This method includes: collecting a first image having a first bounding box of a target object and a second image having a second bounding box of the target object; calculating a reference scale proportion between two bounding boxes; generating a plurality of scale proportions associated with the reference scale proportion; scaling the second bounding box according to each scale proportion to obtain a third bounding box for extracting a first image block from the first image; extracting a second image block from the second image according to the second bounding box; and performing similarity calculation on the first image block and the second image block corresponding to each scale proportion to screen out at least one scale proportion so as to calculate a prediction value of the collision time with the target object.

20 Claims, 4 Drawing Sheets

METHOD AND DEVICE FOR PREDICTING COLLISION TIME BASED ON AN IMAGE

CROSS-REFERENCE TO RELATED APPLICATIONS

This application claims priority to Chinese patent application No. 202310822788.3, titled "METHOD AND DEVICE FOR PREDICTING COLLISION TIME BASED ON IMAGE", filed on Jul. 5, 2023, the content of which is incorporated herein by reference in its entirety.

TECHNICAL FIELD

The present disclosure relates to a technique of predicting a collision time, and more particularly, to a method and a device for predicting a collision time by image similarity, and a computer-readable storage medium.

BACKGROUND

The high-precision Time To Contact (TTC) estimation is needed in the field of automatic driving. The inaccurate TTC estimation will affect the path planning and safety of automatic driving system. Herein. TTC may represent a predicted value of a collision time between a movable object (such as a vehicle) and a target object (e.g., an obstacle or a preceding vehicle).

In the related art, TTC may be predicted by using an optical flow approach or a detection box (bounding box) scale approach. The collision time prediction method based on the optical flow is to infer the moving speed and direction of the object by detecting the change of the intensity of image pixels with time, and then estimate the prediction value of the collision time with the target object. However, the optical flow estimation TTC relies on accurate optical flow information, which results in significant computational overhead. On the other hand, the collision time prediction method according to the scale proportion of the detection frame calculates the scale proportion based on the size of the detection frame in the two-frame image, and then directly calculates TTC. The formula of TTC is calculated according to the scale proportion, $$ttc = \frac{t_1 - t_0}{\frac{1}{\alpha} - 1},$$

where $\alpha$ is a scale proportion from time to $t_0$ time $t_1$. However, when the detection box does not accurately mark the target object (e.g., the size of the detection box in the two-frame image is inconsistent or inaccurate), a large-error TTC is caused.

Therefore, in order to achieve higher accuracy of TTC prediction, it is necessary to propose a more optimized TTC prediction method to improve the efficiency and safety of path planning for automatic driving system.

SUMMARY

In view of the foregoing, the present disclosure proposes a method and a device for predicting collision time based on an image to achieve high-precision collision time prediction.

A first aspect of the present disclosure proposes a method for predicting a collision time based on an image, including: according to a target object, collecting images of a plurality of frames, wherein the images of the plurality of frames include a first image corresponding to a first frame and a second image corresponding to a second frame, and the second frame is after the first frame in a time sequence; calculating a reference scale proportion between two bounding boxes according to a first bounding box corresponding to a first image and a second bounding box corresponding to a second image, wherein the first bounding box and the second bounding box correspond to a target object; generating a plurality of scale proportions associated with the reference scale proportion; scaling the second bounding box according to each scale proportion to obtain a third bounding box for extracting a first image block from the first image; extracting a second image block from the second image from the second bounding box; and performing similarity calculation on the first image block and the second image block corresponding to each scale proportion to screen out at least one scale proportion; and calculating a predicted value of the collision time of the target object according to the selected at least one scale proportion.

A second aspect of the present disclosure provides a device for predicting a collision time based on an image, including one or more processors, and a memory storing a program. The program includes instructions that, when executed by the processor, cause the computing device to perform the above-described method for predicting the collision time based on the image.

A third aspect of the present disclosure is directed to a computer-readable storage medium having stored thereon a program including instructions that, when executed by one or more processors of a computing device, cause the computing device to perform the above-described method for predicting the collision time based on the image.

Based on the above-mentioned disclosure, since the above-mentioned method for predicting the collision time based on the image includes performing similarity calculation on the first image block and the second image block corresponding to each scale proportion to screen out at least one scale proportion; and calculating a predicted value of the collision time of the target object according to the selected at least one scale proportion. The present disclosure can screen an appropriate scale proportion to calculate the prediction value of the collision time by a small number of similarity calculation results, so as to improve the accuracy of the prediction value of the collision time, thereby reducing calculation costs and optimizing the path planning and safety of the automatic driving system.

BRIEF DESCRIPTION OF THE DRAWINGS

The accompanying drawings, which are incorporated in and constitute a part of this specification, illustrate embodiments and, together with the description, serve to explain exemplary embodiments of the embodiments. It will be apparent that the drawings in the following description are only some examples of the invention, and that other drawings may be obtained from the drawings by those skilled in the art without any creative works. Throughout the drawings, the same reference numerals indicate similar, but not necessarily identical, elements.

DETAILED DESCRIPTION

In order to make the purpose, technical solution and advantages of the invention more clear, the invention is further described in detail in combination with the attached drawings. Obviously, the embodiments described are only part of the embodiments of the invention, but not all embodiments. Based on the embodiments in the invention, all other embodiments obtained by a person skilled in the art without involving any inventive effort are within the scope of protection of the invention.

In this disclosure, the term "plurality" refers to two or more, unless defined otherwise. In this disclosure, the term "and/or" describes an associated relationship of associated objects and encompasses any and all possible combinations of the listed objects. The character "/" generally indicates that the associated object is an "or" relationship.

In this disclosure, unless otherwise noted, the use of the terms "first", "second", and the like are used to distinguish between similar objects and are not intended to limit their positional, temporal, or importance relationships. It should be understood that the terms so used may be interchanged, where appropriate, so that the embodiments of the invention described herein can be implemented in a manner other than those illustrated or described herein.

Furthermore, the terms "comprising" and "having", as well as any variations thereof, are intended to cover a non-exclusive inclusion. For example, a process, a method, a system, an article, or a device that includes a list of steps or elements is not necessarily limited to those steps or elements expressly listed, but may include other steps or elements not expressly listed or inherent to such process, method, article, or device.

Figure 1:
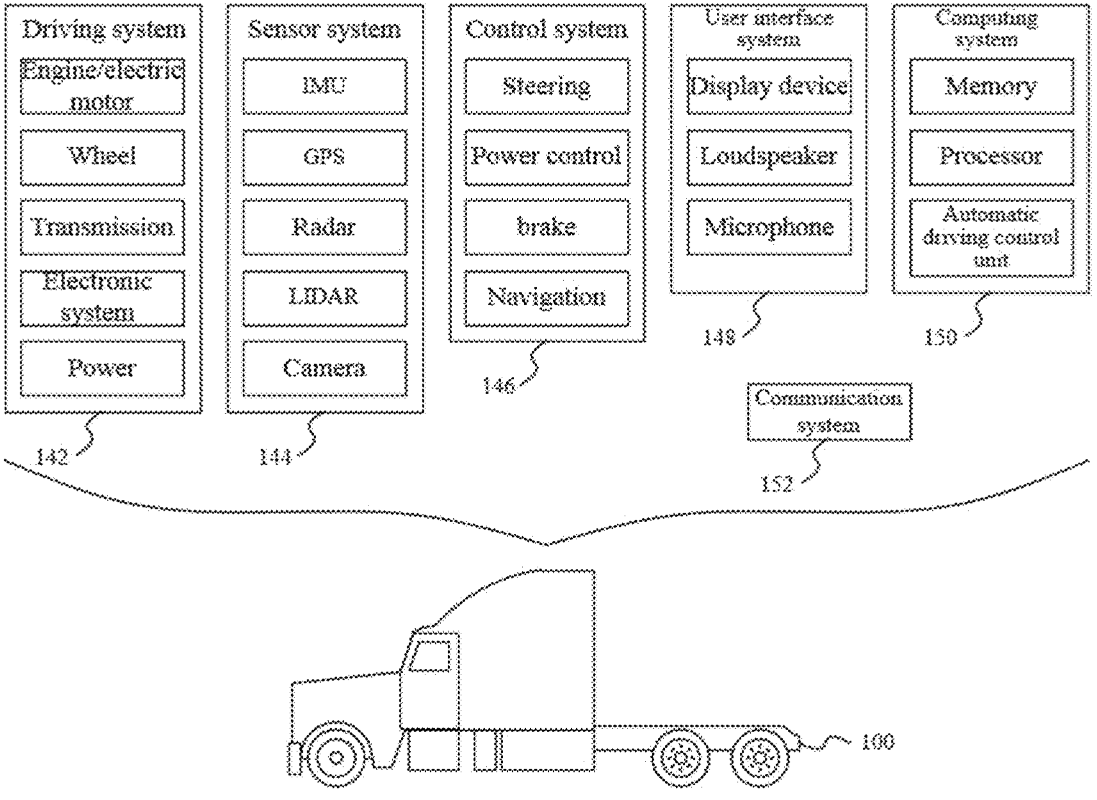
FIG. 1 is a schematic diagram illustrating a vehicle in which various techniques disclosed herein may be implemented.

The present disclosure relates to predicting a collision time for a movable object to collide with a target object. The movable object can be a vehicle, a movable robot, or an aircraft. FIG. 1 is a schematic diagram illustrating a vehicle in which various techniques disclosed herein may be implemented.

Referring to FIG. 1, the vehicle 100 may be a car, a truck, a motorcycle, a bus, a boat, an airplane, a helicopter, a lawn mower, an excavator, a motorcycle ski, an aircraft, a recreational vehicle, an amusement park vehicle, a farm device, a construction device, a tram, a golf cart, a train, a trolley, or other vehicle. The vehicle 100 may be fully or partially operated in an automatic driving mode. The vehicle 100 may control itself in the automatic driving mode, e.g., the vehicle 100 may determine a current state of the vehicle and a current state of an environment in which the vehicle is located, determine a predicted behavior of at least one other vehicle in the environment, determine a level of trust corresponding to a likelihood that the at least one other vehicle will perform the predicted behavior, and control the vehicle 100 itself based on the determined information. While in the automatic driving mode, the vehicle 100 may operate without human interaction.

The vehicle 100 may include various vehicle systems such as a drive system 142, a sensor system 144, a control system 146, a user interface system 148, a computing system 150, and a communication system 152. The vehicle 100 may include more or fewer systems, each of which may include multiple units. Further, each system and unit of the vehicle 100 may be interconnected. For example, the computing system 150 may be in data communication with one or more of the drive system 142, the sensor system 144, the control system 146, the user interface system 148, and the communication system 152. Thus, one or more of the described functions of the vehicle 100 may be divided into additional functional or physical components, or combined into a lesser number of functional or physical components. In a further example, additional functional or physical components may be added to the example shown in FIG. 1.

The drive system 142 may include a plurality of operable components (or units) that provide kinetic energy to the vehicle 100. In some embodiments, the drive system 142 may include an engine or electric motor, wheels, a transmission, an electronic system, and a power source. The engine or electric motor may be any combination of the following: an internal combustion engine, an electric motor, a steam engine, a fuel cell engine, a propane engine, or other form of engine or electric motor. In some embodiments, the engine may convert a power source into mechanical energy. In some embodiments, the drive system 142 may include multiple engines or electric motors. For example, the gasoline-electric hybrid vehicle may include a gasoline engine and an electric motor, among other things.

The wheels of the vehicle 100 may be standard wheels. The wheels of the vehicle 100 may be any of a variety of types of wheels, including one-wheel, two-wheel, three-wheel, or four-wheel types, such as on a car or truck. Other numbers of wheels are possible, for example six wheels or more. One or more wheels of the vehicle 100 may be operated in a different direction of rotation than the other wheels. The wheel may be at least one wheel fixedly connected to the transmission. The wheel may include a combination of metal and rubber, or a combination of other substances. The transmission may include a unit operable to transmit mechanical power of the engine to the wheels. For this purpose, the transmission may include a gearbox, a clutch, a differential gear and a propeller shaft. The transmission may also include other units. The drive shaft may include one or more axles that mate with the wheels. The electronic system may include a unit for transmitting or controlling electronic signals of the vehicle 100. These electronic signals may be used to activate lights, servos, electric motors, and other electronic drive or control devices in the vehicle 100. The power source may be an energy source that wholly or partially powers an engine or an electric motor. That is, the engine or the electric motor can convert the power source into mechanical energy. Illustratively, the power sources may include gasoline, petroleum, petroleum-based fuels, propane, other compressed gaseous fuels, ethanol, fuel cells, solar panels, batteries, and other electrical energy sources. The power source may additionally or alternatively include any combination of a fuel tank, a battery, a capacitor, or a flywheel. The power source may also provide energy to other systems of the vehicle 100.

The sensor system 144 may include sensors for sensing information about the environment and conditions of the vehicle 100. For example, the sensor system 144 may include an inertial measurement unit (IMU), a global navigation satellite system (GNSS) transceiver (e.g., a global positioning system (GPS) transceiver), a radio detection and ranging device (RADAR), a laser detection and ranging system (Lidar), an acoustic sensor, an ultrasound sensor, and an image capture device (e.g., a camera). The sensor system 144 may include sensors (e.g., oxygen ($O_2$) monitors, fuel gauge sensors, engine oil pressure sensors, and temperature, humidity, pressure sensors, etc.) for monitoring the vehicle 100. Of course, in other embodiments, other sensors may be provided. The one or more sensors included in the sensor system 144 may be individually actuated or collectively actuated to update the position, orientation, or both of the one or more sensors.

The IMU may include a combination of sensors (e.g., an accelerator and a gyroscope) for sensing attitude changes (e.g., position changes and direction changes) of the vehicle 100 based on inertial acceleration. The GPS transceiver may be any sensor used to estimate the geographic location of the vehicle 100. For this purpose, the GPS transceiver may include a receiver/transmitter to provide location information of the vehicle 100 relative to the earth. Note that GPS is an example of a global navigation satellite system. Therefore, in some embodiments, the GPS transceiver may be replaced with a Beidou satellite navigation system transceiver or a Galileo satellite navigation system transceiver. The radar unit may use radio signals to sense objects in the environment of the vehicle 100. In some embodiments, in addition to sensing objects, the radar unit may also be used to sense the speed and heading of objects approaching the vehicle 100. The Lidar unit may be any sensor that uses a laser to sense objects in the environment of the vehicle 100. In some embodiments, the Lidar unit may include a laser source, a laser scanner, and a detector. The Lidar unit is used to operate in either a continuous (e.g., using heterodyne detection) or discontinuous detection mode. The image capture device may include means for capturing a plurality of images of the environment in which the vehicle 100 is located. One example of an image capture device is a camera, which may be a still image camera or a motion video camera.

The control system 146 is used to control the operation of the vehicle 100 and its components (or units). Accordingly, the control system 146 may include various units, such as a steering unit, a power control unit, a brake unit, and a navigation unit.

The steering unit may be a combination of machines that adjust the forward direction of the vehicle 100. The power control unit (which may be, for example, an accelerator) may be used, for example, to control the operating speed of the engine and thus the speed of the vehicle 100. The brake unit may include a combination of machines for decelerating the vehicle 100. The brake unit can decelerate the vehicle with friction in a standard manner. In other embodiments, the brake unit may convert kinetic energy of the wheel into electrical current. The brake unit may also take other forms. The navigation unit may be any system that determines a driving path or route for the vehicle 100. The navigation unit may also dynamically update the driving path during travel of the vehicle 100. The control system 146 may additionally or alternatively include other components (or units) not shown or described.

The user interface system 148 may be used to allow interaction between the vehicle 100 and external sensors, other vehicles, other computer systems, and/or users of the vehicle 100. For example, the user interface system 148 may include a standard visual display device (e.g., a plasma display, a liquid crystal display (LCD), a touch screen display, a head mounted display, or other similar display), a speaker or other audio output device, a microphone, or other audio input device. For example, the user interface system 148 may also include a navigation interface and an interface to control the internal environment (e.g., temperature, air conditioning, etc.) of the vehicle 100.

The communication system 152 may provide a way for vehicle 100 to communicate with one or more devices or other surrounding vehicles. In one exemplary embodiment, the communication system 152 may communicate with one or more devices directly or through a communication network. The communication system 152 may be, for example, a wireless communication system. For example, the communication system may use 3G cellular communication (e.g., CDMA, EVDO, GSM/GPRS) or 4G cellular communication (e.g., WiMAX or LTE), and may also use 5G cellular communication. Alternatively, the communication system may communicate with a wireless local area network (WLAN) (e.g., using WIFI®). In some embodiments, the communication system 152 may communicate directly with one or more devices or other surrounding vehicles, for example, using infrared, Bluetooth®, or ZIGBEE. In other embodiments, other wireless protocols may be used, such as various in-vehicle communication systems, and are within the scope of the present disclosure. For example, the communication system may include one or more dedicated short-range communication (DSRC) devices, V2V devices, or V2X devices that communicate publicly or privately data with vehicles and/or roadside stations.

The computing system 150 can control some or all of the functions of the vehicle 100. The automatic driving control unit in the computing system 150 may be used to identify, evaluate, and avoid or cross potential obstacles in the environment in which the vehicle 100 is located. In general, the automatic driving control unit may be used to control the vehicle 100 without a driver, or to provide assistance for the driver to control the vehicle. In some embodiments, the automatic driving control unit is configured for combining data from sensors, such as GPS transceiver data, radar data, Lidar data, camera data, and data from other vehicle systems to determine a travel path or trajectory of the vehicle 100. The automatic driving control unit may be activated to enable the vehicle 100 to be driven in an automatic driving mode.

The computing system 150 may include at least one processor (which may include at least one microprocessor) that executes processing instructions (i.e., machine-executable instructions) stored in a non-volatile computer-readable medium, such as a data storage device or a memory. The computing system 150 may also be a plurality of computing devices that distributedly control components or systems of the vehicle 100. In some embodiments, the memory may contain processing instructions (e.g., program logic) that are executed by the processor to perform various functions of the vehicle 100. In some embodiments, the computing system 150 can be in data communication with the drive system 142, the sensor system 144, the control system 146, the user interface system 148, and/or the communication system 152. The interface in the computing system is used to facilitate data communication between the computing system 150 and the drive system 142, the sensor system 144, the control system 146, the user interface system 148, and the communication system 152.

The memory may also include other instructions, including instructions for data transmission, instructions for data reception, instructions for interaction, or instructions for controlling the drive system 142, the sensor system 144, or the control system 146 or the user interface system 148.

In addition to storing processing instructions, the memory may store a variety of information or data, such as image processing parameters, road maps, and route information. Such information may be used by the vehicle 100 and the computing system 150 during the operation of vehicle 100 in an automatic, semi-automatic, and/or manual mode.

Although the automatic driving control unit is shown separate from the processor and memory, it should be understood that in some embodiments, some or all of the functions of the automatic driving control unit may be implemented with program code instructions residing in one or more memories (or data storage devices) and executed by one or more processors, and that the automatic driving control unit may in some cases be implemented using the same processor and/or memory (or data storage device). In some embodiments, the automatic driving control unit may be implemented at least in part using various dedicated circuit logic, various processors, various field programmable gate arrays ("FPGA"), various application specific integrated circuits ("ASIC"), various real-time controllers, and hardware.

The computing system 150 may control the functions of vehicle 100 based on inputs received from various vehicle systems (e.g., a drive system 142, a sensor system 144, and a control system 146) or inputs received from user interface system 148. For example, the computing system 150 may use input from the control system 146 to control the steering unit to avoid an obstacle detected by the sensor system 144. In some embodiments, the computing system 150 may be used to control various aspects of the vehicle 100 and its systems.

Although FIG. 1 shows various components (or units) integrated into the vehicle 100, one or more of these components (or units) may be mounted on the vehicle 100 or individually associated with the vehicle 100. For example, the computing system 150 may exist partially or completely independent of the vehicle 100. Thus, the vehicle 100 can exist as a separate or integrated unit of equipment. The device units constituting the vehicle 100 may communicate with each other by wire communication or wireless communication. In some embodiments, additional components or units may be added to each system or one or more of the above components or units may be removed from the system (e.g., the Lidar or radar shown in FIG. 1).

Embodiments of the present disclosure provide a method for predicting a collision time based on an image and a related device for improving accuracy of a collision time TTC between a movable object (such as vehicle 100) and a target object (such as a preceding vehicle or an obstacle). The movable object has an image acquisition device for collecting the plurality of the images. Embodiments of the present disclosure can address the TTC of large errors caused by calculating the collision time directly by the size ratio of the detection box/bounding box and provide a more accurate TTC to optimize the path planning and safety of the automatic driving system.

Figure 2:
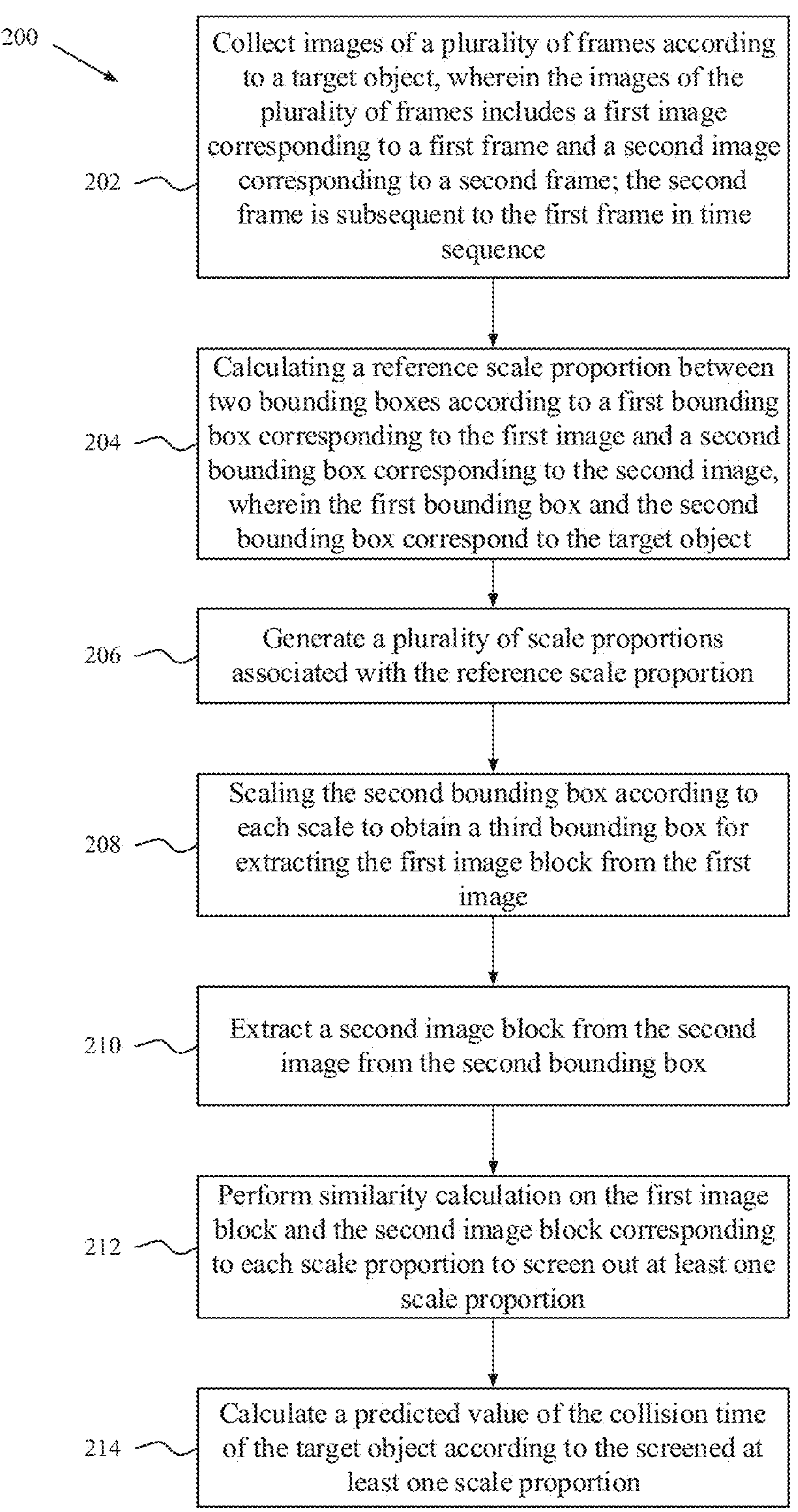
FIG. 2 is a flowchart illustrating a method for predicting a collision time based on an image according to an embodiment of the present disclosure.

FIG. 2 is a flowchart illustrating a method 200 for predicting a collision time based on an image according to an embodiment of the present disclosure.

Referring to FIG. 2, a method 200 for predicting a collision time based on an image according to an embodiment of the present disclosure is applicable to the vehicle 100.

In step 202, the vehicle 100 or the computing system 150 collects a plurality of frames of images according to the target object, wherein the images of a plurality of frames include a first image corresponding to a first frame and a second image corresponding to a second frame, the second frame being temporally subsequent to the first frame. That is, the second image is subsequent to the first image in the image sequence, or the second image is collected subsequently to the first image. In step 204, the vehicle 100 or the computing system 150 calculates a reference scale proportion between two bounding boxes according to a first bounding box corresponding to the first image and a second bounding box corresponding to the second image, wherein the first bounding box and the second bounding box correspond to the target object. In step 206, the vehicle 100 or the computing system 150 generates a plurality of scale proportions associated with the reference scale proportion. In step 208, the vehicle 100 or the computing system 150 scales the second bounding box according to each scale proportion to obtain a third bounding box for extracting the first image block from the first image. In step 210, the vehicle 100 or the computing system 150 retrieves a second image block from the second image by the second bounding box. In step 212, the vehicle 100 or the computing system 150 performs similarity calculation on the first image block and the second image block corresponding to each scale proportion to screen out at least one scale proportion. In step 214, the vehicle 100 or the computing system 150 calculates a predicted value of the collision time of the target object according to the at least one scale proportion screened out.

The method 200 of an embodiment of the present disclosure first generates a plurality of different scale proportions to scale the bounding box according to the proportion between the bounding boxes of the two-frame images on the time sequence to perform cropping in the two-frame images, performs similarity calculation on the two-frame cropped images to screen out a better scale proportion, and calculate a collision time from the filtered scale proportion.

In some embodiments, for example in step 212, the step of the vehicle 100 or the computing system 150 performing similarity calculation on the first image block and the second image block corresponding to each scale proportion to screen out at least one scale proportion includes the following processes.

The vehicle 100 or the computing system 150 calculates a Mean Squared Error of the pixel values for the first image block and the second image block based on each scale proportion, and selects at least one minimum squared error (MSE) of the pixel values from the squared errors of pixel values calculated based on each scale proportion to obtain at least one scale proportion corresponding to the at least one minimum squared error of the pixel values.

In some embodiments, the filtering used to calculate the scale proportion of the TTC is based on the Mean Squared Error (MSE) of the pixel values. However, in other embodiments, the filtering used to calculate the scale proportion of the TTC may be based on the structure similarity index (SSIM), the peak signal-to-noise ratio (PSNR), the normalized cross-correlation (NCC), or the Manhattan distance (otherwise known as the L1 norm), but is not limited thereto.

In detail, the mean square error MSE is the most common method of measuring image differences. It simply calculates the average of the squares of the differences between the corresponding pixels of the two images.

The structural similarity index SSIM is a more complex measurement method that takes into account the structural information of images. SSIM compares not only the pixel values of the two images, but also their brightness, contrast and structural similarity within a local window. The value of SSIM is for example between −1 and 1. The closer the value of SSIM is to 1, the more similar the image is represented.

The peak signal-to-noise ratio (PSNR) is a measure of image compression quality, and can also be used to compare the difference between two images. PSNR is commonly used to measure the reconstruction quality of images. The higher the PSNR value, the better the image quality and the smaller the error.

Normalized cross-correlation NCC is a metric used to compare two images. It is often used in the pattern recognition and image processing to find the location of a small image (called a template) in a large image. NCC can handle brightness and contrast changes of images well. The value of NCC is for example between −1 and 1. The closer the value of NCC is to 1, the more similar the image is represented.

The Manhattan distance/L1 norm calculates the sum of the absolute values of the corresponding pixel differences of the two images.

In some embodiments, for example in step 212, the step of the vehicle 100 or the computing system 150 performing similarity calculation on the first image block and the second image block corresponding to each scale proportion to screen out at least one scale proportion includes the following processes.

The vehicle 100 or the computing system 150 computes a value of a structural similarity index (SSIM) of the first image block and the second image block based on each scale proportion. Thereafter, the vehicle 100 or the computing system 150 selects at least one maximum value of the structural similarity index from the values of the structural similarity index calculated based on each scale proportion to obtain at least one scale proportion to which the at least one maximum value of the structural similarity index corresponds.

In some embodiments, for example in step 212, the step of the vehicle 100 or the computing system 150 performing similarity calculation on the first image block and the second image block corresponding to each scale proportion to screen out at least one scale proportion includes the following processes. That is, the vehicle 100 or the computing system 150 calculates a similarity between the first image block and the second image block based on each scale proportion. The similarity comprises at least one of a mean squared error of pixel values between the first image block and the second image block, a structural similarity index of the first image block and the second image block, a normalized cross-correlation value of the first image block and the second image block, a Manhattan distance of the first image block from the second image block.

The vehicle 100 or the computing system 150 calculates a value of a peak signal-to-noise ratio (PSNR) of the first image block and the second image block based on each scale proportion. Thereafter, the vehicle 100 or the computing system 150 selects at least one maximum peak signal-to-noise ratio value from the calculated peak signal-to-noise ratio values based on each scale to obtain at least one scale proportion to which the at least one maximum peak signal-to-noise ratio value corresponds.

In some embodiments, for example in step 212, the step of the vehicle 100 or the computing system 150 performing similarity calculation on the first image block and the second image block corresponding to each scale proportion to screen out at least one scale proportion includes the following processes.

The vehicle 100 or computing system 150 computes a value for the normalized NCC of the first image block and the second image block based on each scale proportion. Thereafter, the vehicle 100 or the computing system 150 selects at least one maximum normalized cross-correlation value from the normalized cross-correlation values calculated based on each scale proportion to obtain the at least one scale proportion to which the at least one maximum normalized cross-correlation value corresponds.

In some embodiments, for example in step 212, the step of the vehicle 100 or the computing system 150 performing similarity calculation on the first image block and the second image block corresponding to each scale proportion to screen out at least one scale proportion includes the following processes.

The vehicle 100 or the computing system 150 computes a value of the Manhattan distance of the first image block and the second image block based on each scale proportion. Thereafter, the vehicle 100 or the computing system 150 selects at least one minimum value of the Manhattan distance from the calculated values of the Manhattan distance based on each scale proportion to obtain at least one scale proportion corresponding to the at least one minimum value of the Manhattan distance.

In some embodiments, for example in step 214, the step of the vehicle 100 or the computing system 150 calculating a predicted value of the collision time of the target object according to the at least one scale proportion screened out includes the following process.

The vehicle 100 or the computing system 150 calculates a predicted value of the collision time based on at least one scale proportion corresponding to at least one minimum mean squared error of the pixel values.

In some embodiments, for example in step 214, the step of the vehicle 100 or the computing system 150 calculating a predicted value of the collision time of the target object according to the at least one scale proportion screened out includes the following process.

The vehicle 100 or the computing system 150 calculates a predicted value of the collision time according to at least one scale proportion corresponding to at least one minimum squared error of the pixel values, at least one maximum value of the structural similarity index, at least one maximum value of the peak signal-to-noise ratio, at least one maximum value of the normalized cross-correlation, or at least one minimum value of the Manhattan distance.

In some embodiments, the vehicle 100 or the computing system 150 may further perform a weighted average operation (a first weighted average operation) on the collision time calculated by the at least one scale proportion to obtain a predicted value of the collision time.

In some embodiments, the vehicle 100 or the computing system 150 may further perform a weighted average operation (a second weighted average operation) on at least one scale proportion to obtain a weighted average scale proportion. Then, the predicted value of the collision time is calculated according to the weighted average scale proportion.

In some embodiments, such as in step 206, the vehicle 100 or the computing system 150 generates a plurality of scale proportions based on the reference scale proportion and the parameter range associated with the reference scale proportion.

In some embodiments, for example in step 206, the vehicle 100 or the computing system 150 calculates a minimum scale proportion and a maximum scale proportion according to the reference scale proportion and the parameter range. Thereafter, the vehicle 100 or the computing system 150 generates a plurality of scale proportions within the minimum scale proportion and the maximum scale proportion based on the minimum scale proportion and the maximum scale proportion.

In some embodiments, the vehicle 100 or the computing system 150 sets the parameter range based on the distance of the imaging device used to collect the images of the plurality of frames from the target object. In short, the setting of the parameter range is related to the distance of the host vehicle from the target object.

In some embodiments, the reference scale proportion includes at least one of a width proportion and a height proportion between two bounding boxes.

In some embodiments, the plurality of scale proportions includes at least one of a width proportion and a height proportion associated with a reference scale proportion.

In some embodiments, for example in step 208, the vehicle 100 or the computing system 150 scales the second bounding box according to the width proportion and a height proportion in each scale proportion.

In some embodiments, for example in step 208, the vehicle 100 or the computing system 150 retrieves the first image block from the first image by the third bounding box based on the central position of the first bounding box.

In some embodiments, for example in step 208, the step of the vehicle 100 or the computing system 150 scaling the second bounding box according to each scale to obtain a third bounding box for extracting the first image block from the first image includes the following process:

The vehicle 100 or the computing system 150 extracts a central image block from the first image by the third bounding box based on the central position of the first bounding box. The vehicle 100 or the computing system 150 adjusts a central position of the first bounding box to at least one other position on the first image. For each other location, the vehicle 100 or the computing system 150 extracts other image blocks from the first image by the third bounding box to obtain at least one other image block. The vehicle 100 or the computing system 150 performs similarity calculation on the central image block and the at least one other image block respectively with the second image block, to screen from the central image block and the at least one other image block to obtain the first image block. In short, in order to reduce the error caused by the misalignment of the center of the first bounding box, the center of the first bounding box is shifted and then other image blocks with different central positions are extracted from the first bounding box by the third bounding box. Further, the vehicle 100 or the computing system 150 performs similarity calculation of the center image block and the other image blocks respectively with the second image block, to screen the appropriate first image block.

In some embodiments, the vehicle 100 or the computing system 150 calculates a similarity (such as the mean squared error of the pixel values, or the above-mentioned structural similarity index, peak signal-to-noise ratio, normalized cross-correlation, or Manhattan distance) between the central image block and at least one other image block, respectively, with the second image block. The vehicle 100 or the computing system 150 selects one of the central image block or the at least one other image block corresponding to the maximum similarity (such as the minimum mean squared error of the pixel values, or the maximum value of the structural similarity index, the maximum value of the peak signal-to-noise ratio, the maximum value of the normalized cross-correlation, or the minimum value of the Manhattan distance) from the calculated similarity result as the first image block.

In some embodiments, the vehicle 100 or the computing system 150 resizes the first image block to be the same size as the second image block before performing the similarity calculation.

In some embodiments, prior to performing the similarity calculation, the vehicle 100 or the computing system 150 scales the width and height of the first image block to be the same as the width and height of the second image block.

The process by which the disclosed embodiments specifically predict TTC is described in detail below.

Figure 3:
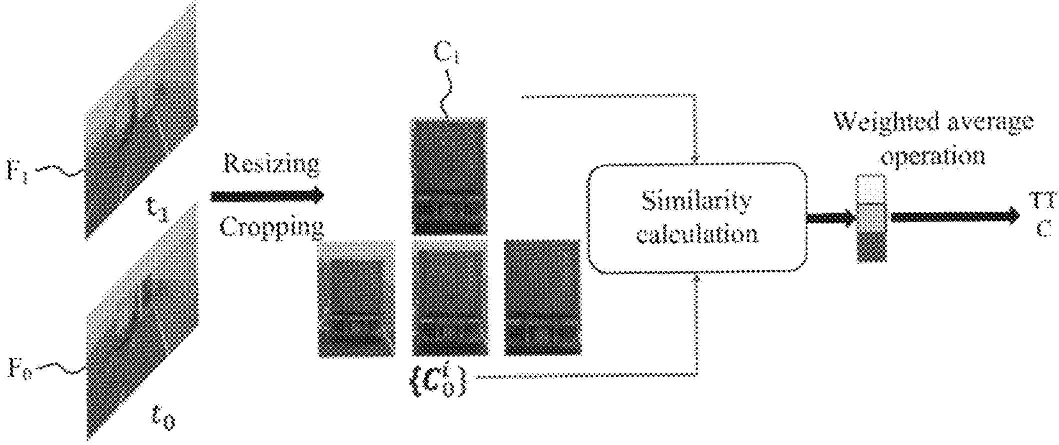
FIG. 3 is a schematic diagram illustrating a process for predicting a collision time based on an image according to an embodiment of the present disclosure.

FIG. 3 is a schematic diagram illustrating a process for predicting a collision time based on an image according to an embodiment of the present disclosure.

As shown in FIG. 3 in the two frames of images $F_0$ and $F_1$ at times to and $t_1$, the vehicle 100 or the computing system 150 tracks the particular vehicle and labels it with a bounding box to compute the TTC between the vehicle 100 and the particular vehicle. The representation of the bounding box may be $b_i=[x_i, y_i, w_i, h_i]$, where i=0,1, $x_i$, $y_i$ is the center point coordinate of the bounding box; and $w_i$, $h_i$ is the width and height of the bounding box. Therefore, the width proportion and the height proportion of the bounding boxes in the two frame images $F_0$ and $F_1$ can be expressed as:

$$\alpha_w = \frac{w_0}{w_1},\ \alpha_h = \frac{h_0}{h_1}.$$

Further, the vehicle 100 or the computing system 150 may obtain the minimum scale proportion and the maximum scale proportion, respectively, according to a preset scale proportion range r (the scale proportion ranger may be set empirically, for example, 0.1 or 0.2). The minimum scale proportion $\alpha_{min}$ can be expressed as $\alpha_{min}=\min(\alpha_w, \alpha_h)-r$. That is, the minimum scale proportion $\alpha_{min}$ may be to select a smaller one from the width proportion $\alpha_w$ and the height proportion and subtract a preset scale proportion range r. The maximum scale proportion $\alpha_{max}$ can be expressed as $\alpha_{max}=\max(\alpha_w, \alpha_h)+r$. That is, the maximum scale proportion $\alpha_{max}$ may be to select a larger one from a width proportion $\alpha_w$ and a height proportion $\alpha_h$ and add a preset scale proportion range r. Alternatively, an appropriate minimum scale proportion $\alpha_{min}$, a maximum scale proportion $\alpha_{max}$, and a preset scale proportion range r may be set according to other criteria.

Next, the vehicle 100 or computing system 150 may enumerate n scale proportions based on the minimum scale proportion and the maximum scale proportion (e.g., linearly generate n scale proportions based on a range of data between the minimum scale proportion and the maximum scale proportion), n can be set empirically, e.g., 20 or 30), where n scale proportions can be expressed as:

$$\alpha_i = \alpha_{min} + \frac{\alpha_{max} - \alpha_{min}}{n-1},\ \ i = 0, 1, \ldots n-1\ .$$

In this embodiment, the image block is obtained by cropping the image $F_1$ by its bounding box. With regard to each scale proportion $\alpha_i$, taking $(x_0, y_0)$ as a center (namely, a center point coordinate $(x_0, y_0)$ of a bounding box $b_0$), by cropping an image block with the width being $\alpha_i w_1$ and the height being $\alpha_i h_1$ on the image $F_0$ (namely, scaling the width and the height of the bounding box $b_1$ according to each scale proportion, and then cropping the image $F_0$), and scaling the cropped image block to an image block $$C_0^i$$

with the width being $w_1$ and the height being $h_1$ (namely, scaling the cropped image block to the same size as an image block $C_1$ cropped by the bounding box $b_1$). The means of scaling described above may for example be by means of interpolation. The vehicle 100 or computing system 150 calculates a similarity between the first image block and the second image block for each scale proportion, and selects at least one scale proportion corresponding to at least one maximum similarity. For example, the vehicle 100 or computing system 150 selects k scale proportions corresponding to k maximum similarities. The k maximum similarities can be k minimum mean squared errors of the pixel values, k maximum structural similarity indexes, k maximum peak signal-to-noise ratio values, k maximum normalized cross-correlation values, or k minimum Manhattan distances. Further, the variety of the parameters of the similarity can be weighted average to obtain a final value of the similarity. In some embodiment, the vehicle 100 or computing system 150 calculates the mean square error $mse_i$ of the pixel values of image blocks $$C_0^i$$

and $C_1$. Then, the vehicle 100 or the computing system 150 may obtains k scale proportions $\alpha_{j_0}, \alpha_{j_1}, \ldots \alpha_{j_{k-1}}$ (k may be set empirically, for example, 3) corresponding to the at least one minimum mean square error $mse_i$ (such as the k minimum mean square errors), and then obtain a weighted average collision time by a weighted average operation of the k scale proportions. The weighted average collision time TTC may for example be expressed as:

$$TTC = \frac{1}{\sum_{i=0}^{k-1} \frac{1}{mse_i}} \sum_{i=0}^{k-1} \frac{(t_1 - t_0)}{\left(\frac{1}{\alpha_{j_i}} - 1\right) mse_i}.$$

In short, the vehicle 100 or the computing system 150 calculates a weighted average of the TTC corresponding to each of the screened scale proportions $\alpha_{j_0}, \alpha_{j_1}, \ldots \alpha_{j_{k-1}}$ to obtain a predicted value of the TTC.

In particular, the mathematical relationship between scale proportion and TTC is non-linear. When the scale proportion is close to 1, a large TTC value will be calculated, which has a greater impact on the TTC value of the final weighted average. Thus, in some embodiments, a weighted average may be calculated for the scaling proportion prior to calculating the predicted value for TTC. Specifically, the vehicle 100 or the computing system 150 may obtain the weighted average scale proportion by performing a weighted average operation on the k scale proportions $\alpha_{j_0}, \alpha_{j_1}, \ldots \alpha_{j_{k-1}}$ corresponding to the k minimum mean square error of the pixel values. The vehicle 100 or computing system 150 may then calculate a predicted value for TTC based on this weighted average scale proportion. The weighted average scale proportion $\overline{\alpha}$ may, for example, be expressed as:

$$\overline{\alpha} = \frac{1}{\sum_{i=0}^{k-1} \frac{1}{mse_i}} \sum_{i=0}^{k-1} \frac{\alpha_{j_i}}{mse_i}$$

The predicted value of TTC calculated from the weighted average scale proportion can be expressed as:

$$TTC = \frac{t_1 - t_0}{\frac{1}{\alpha} - 1}$$

It should be noted that, in addition to calculating the mean square error of the pixel values of image blocks $$C_0^i$$

and $C_1$, the collision time TTC can also be calculated by calculating the structure similarity index SSIM, the peak signal-to-noise ratio PSNR, the normalized cross-correlation NCC or the Manhattan distance/L1 norm of the image blocks $$C_0^i$$

and $C_1$ to screen out the appropriate scale proportion.

Further, in order to reduce an error caused by misalignment of the center of the bounding box $b_0$, an offset may be performed for the center point coordinate $(x_0, y_0)$ (for example, offsetting the center point by a predetermined number (for example, a predetermined number is 1) of pixels in the up, down, left, and right directions, respectively, with $x_0, y_0$) as a reference point). The image blocks are then individually cropped according to the shifted center points to calculate from these image blocks the mean square error of the pixel values of each image block and the image block $C_1$. The image block corresponding to the minimum mean square error of the pixel values among these image blocks is then taken to be the image blocks $$C_0^i$$

at a particular scale proportion.

For example, for each scale $\alpha_i$, prior to performing the similarity calculation of the image blocks $$C_0^i$$

and $C_1$, the image block $$C_0^i$$

is determined by means of the above-mentioned center point offset. Four positions can be formed by offsetting the center point in the upward, downward, left, and right directions, respectively, with (as a reference point (central position). Further, four positions are formed by offsetting the center point in the directions of left-upper, right-upper, left-lower, right-lower, etc. $(x_0, y_0)$ as a reference (central position)). At this time, there are 9 dots including the central position as well as 8 other positions, and the 9 dots are, for example, formed in an orderly arrangement of 3×3. Then, the image is respectively cropped according to these 9 points to obtain 9 image blocks, so as to calculate the mean square error of the pixel values between each image block and the image block $C_1$. Then, the image block corresponding to the minimum mean square error of the pixel value among the 9 image blocks is taken to be the image block $$C_0^i$$

at this scale proportion.

On the other hand, as the distance between the vehicle 100 and the target object increases, the range of the scale proportion theoretically decreases. Therefore, the scale proportion range r can be set to correlate with the distance of the target object, thereby improving the TTC prediction accuracy of distant targets.

Table 1 below is a comparison between the scale proportion for collision time prediction based on the conventional detection box and the scale proportion obtained by the image-based collision time prediction of the embodiment of the present disclosure. In detail, Table 1 compares the average error values between the scale proportion obtained by the image-based collision time prediction of the present disclosure and the scale proportion obtained by the conventional direct detection box, respectively, with the true scale proportion at different distances. In an embodiment, the true scale proportion may be obtained by Lidar on the vehicle, for example, by Lidar ranging to obtain a true TTC, and back-calculating the true scale proportion.

TABLE 1

| Distance (meters) | 20-40 | 40-60 | 60-80 | 80-100 | 100-120 | 120-140 | >140 |
|---|---|---|---|---|---|---|---|
| Average error for scale proportion based on conventional detection box | 0.008 | 0.006 | 0.005 | 0.006 | 0.003 | 0.004 | 0.004 |
| Average error for scale proportion based on the method of the present disclosure | 0.005 | 0.004 | 0.004 | 0.003 | 0.003 | 0.002 | 0.003 |

As shown in Table 1, the implementation in accordance with the present disclosure results in a scale proportion that has less error than a true scale proportion, resulting in a more accurate TTC. In other words, the present disclosure implements a smaller TTC error when the detection box/bounding box is inaccurate as compared to traditional methods that calculate TTC directly based on the detection box scale. Therefore, the image-based collision time prediction method of the disclosed embodiment can achieve a higher accuracy of TTC prediction, so that the path planning efficiency and safety of the automatic driving system can be improved. Further, since the image-based collision time prediction method of the disclosed embodiment does not need to rely on accurate optical flow information, the computational overhead is low.

Figure 4:
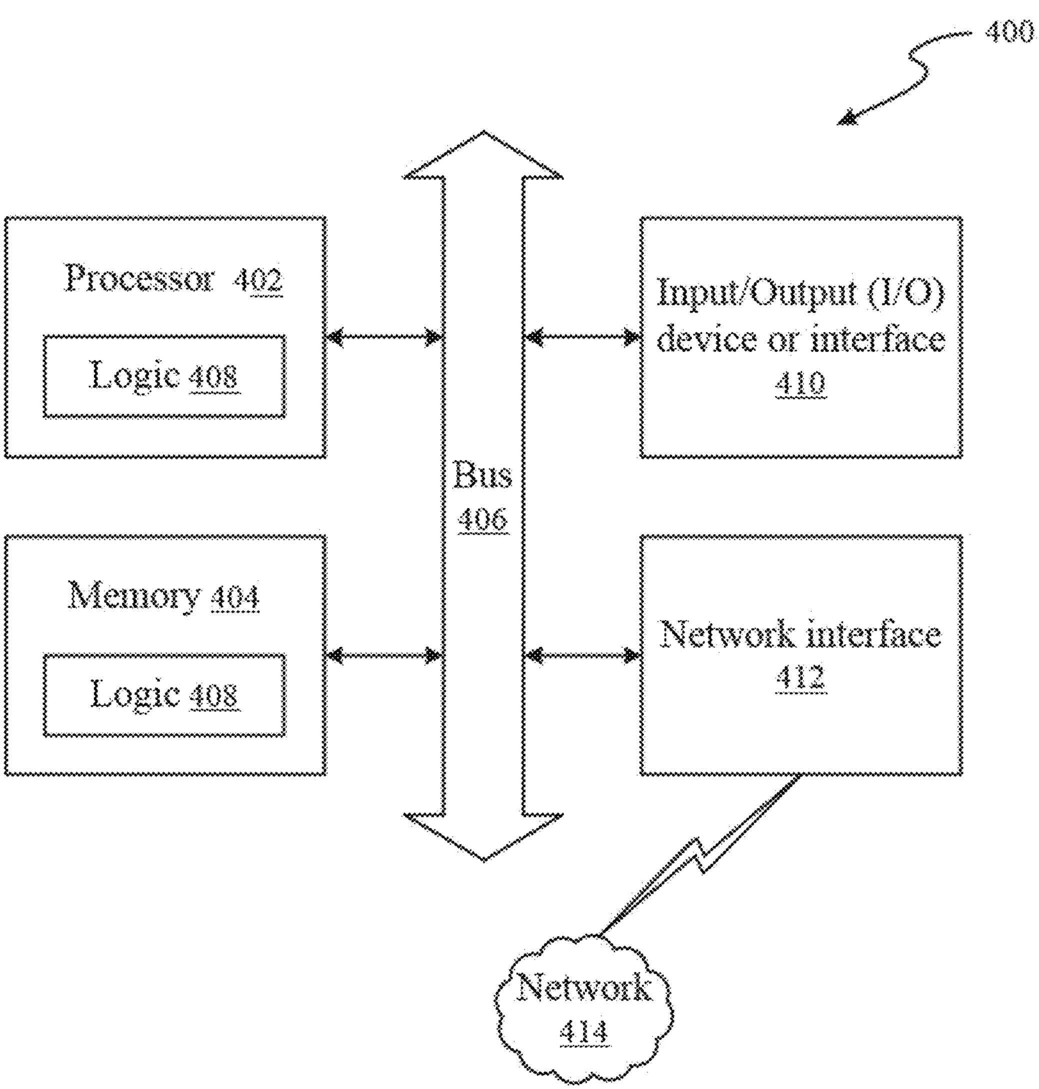
FIG. 4 is a schematic diagram illustrating a computing device according to an embodiment of the present disclosure.

FIG. 4 is a schematic diagram illustrating a computing device according to an embodiment of the present disclosure.

Referring to FIG. 4, in some embodiments, the computing system 150 may be implemented in the form of a computing device 400.

In some embodiments, within the computing device 400, a set of instructions, when executed, and/or processing logic, when initiated, may cause the machine to perform any one or more of the methodologies described and/or claimed herein. In alternative embodiments, the machine operates as a standalone device, or may be connected (e.g., networked) to other machines. In a networked deployment, a machine may operate in the identity of a server or client machine in a server-client network environment, or as a peer in a peer-to-peer (or distributed) network environment. The machine may be a personal computer (PC), a laptop computer, a tablet computing system, a personal digital assistant (PDA), a cellular telephone, a smart phone, a network appliance, a set-top box (STB), a network router, switch or bridge, or any machine capable of executing a set of instructions that specify actions to be taken by that machine, either sequentially or otherwise, or initiate processing logic. Further, although only a single machine is illustrated, the term “machine” may also be understood to include any collection of machines that individually or jointly execute a set of instructions (or sets of instructions) to perform any one or more of the methods described and/or claimed herein.

The computing device 400 may include a data processor 402 (e.g., a system SoC, a general purpose processing core, a graphics core, and optionally other processing logic) and a memory 404 (e.g., memory) that may communicate with each other via a bus 406 or other data transfer system. The computing device 400 may also include various input/output (I/O) devices and/or interfaces 410, such as a touch screen display, an audio jack, a voice interface, and an optional network interface 412. In example embodiments, the network interface 412 may include one or more radio transceivers configured for interfacing with any one or more standard wireless and/or cellular protocols or access technologies (e.g., second-generation (2G), 2.5-generation, third-generation (3G), fourth-generation (4G) and next-generation radio access for cellular systems, Global System for Mobile Communications (GSM), general packet radio service (GPRS), Enhanced Data Gsm Environment (EDGE), Wideband Code Division Multiple Access (WCDMA), LTE, CDMA2000, WLAN. Wireless Router (WR) mesh, etc.). The network interface 412 may also be configured for use with various other wired and/or wireless communication protocols including TCP/IP, UDP, SIP, SMS, RTP, WAP, CDMA, TDMA, UMTS, UWB, WiFi, WiMax, Bluetooth©, IEEE802.11x, etc. In essence, the network interface 412 may include or support virtually any wired and/or wireless communication and data processing mechanism by which information/data may travel between the computing device 400 and another computing or communication system via the network 414.

The memory 404 may represent a machine-readable medium (or computer-readable storage medium) on which is stored one or more sets of instructions, software, firmware, or other processing logic (e.g., a logic 408) that implements any one or more of the methods or functions described and/or claimed herein. The logic 408, or a portion thereof, may also reside, completely or at least partially, within the processor 402 during execution by the computing device 400. As such, the memory 404 and the processor 402 may also constitute a machine-readable medium (or computer-readable storage medium). The logic 408 or a portion thereof may also be configured as a processing logic or a logic, at least a portion of which is partially implemented in hardware. The logic 408 or a portion thereof may also be transmitted or received over the network 414 via the network interface 412. Although the machine-readable medium (or the computer-readable storage medium) of the example embodiments may be a single medium, the term "machine-readable medium" (or computer-readable storage medium) should be taken to include a single non-transitory medium or multiple non-transitory media (e.g., a centralized or distributed database and/or associated caches and computing systems) that store the one or more sets of instructions. The term "machine-readable medium" (or computer-readable storage medium) may also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" (or computer-readable storage medium) can thus be interpreted to include, but is not limited to, solid-state memories, optical media, and magnetic media.

The disclosed and other embodiments, modules, and functional operations described in this document may be implemented in a digital electronic circuitry, or in a computer software, a firmware, or a hardware (including the structures disclosed in this document and their structural equivalents), or in combinations of one or more of them. The disclosed and other embodiments may be implemented as one or more computer program products, that is, one or more modules of computer program instructions encoded on a computer-readable medium for execution by, or to control the operation of, data processing device. The computer-readable medium can be a machine-readable storage device, a machine-readable storage substrate, a memory device, a composition of matter effecting a machine-readable propagated signal, or a combination of one or more of them. The term "data processing device" encompasses all apparatus, devices, and machines for processing data, including, for example, a programmable processor, a computer, or multiple processors or computers. In addition to hardware, the device may include code that creates an execution environment for the computer program in question, such as code that constitutes processor firmware, a protocol stack, a database management system, an operating system, or a combination of one or more of them. The propagated signal is an artificially generated signal, such as an electrical, optical or electromagnetic signal generated by a machine, that is generated to encode information to be transmitted to a suitable receiver device.

The computer program (also referred to as a program, a software, a software application, a script, or a code) can be written in any form of programming language, including compiled or interpreted languages, and it can be deployed in any form, including as a stand-alone program or as a module, a component, a subroutine, or any other unit suitable for use in a computing environment. The computer program does not necessarily correspond to a file in a file system. The program may be stored in a portion of a file that holds other programs or data (e.g., one or more scripts stored in a markup language document), or in a single file dedicated to the program in question, or in multiple collaboration files (e.g., files that store one or more modules, subroutines, or portions of code). The computer program may be deployed to be executed on one computer or on multiple computers that are located at one site or distributed across multiple sites and interconnected by a communication network.

The processes and logic flows described in this document may be executed by one or more programmable processors executing one or more computer programs to perform functions by operating on input data and generating output. The processes and logic flows may also be performed by, and the device may be implemented as, special purpose logic circuitry, e.g., an FPGA (field programmable gate array) or an ASIC (application specific integrated circuit).

The processors suitable for the execution of a computer program include, by way of example, both general and special purpose microprocessors, and any one or more processors of any kind of digital computer. Generally, the processor will receive instructions and data from a read-only memory or a random access memory or both. The essential elements of a computer are a processor for executing instructions and one or more memory devices for storing instructions and data. Typically, the computer will also include, or be operatively coupled to receive data from or transfer data to, or both, one or more mass storage devices (e.g., magnetic, magneto-optical disks, or optical disks) for storing data. However, the computer need not have such a device. The computer-readable media suitable for storing computer program instructions and data include all forms of non-volatile memory, media and memory devices, including by way of example semiconductor memory devices, such as EPROM, EEPROM and flash memory devices; a magnetic disk, such as an internal hard disk or a removable disk; magneto-optical disks; and CD-ROM discs and DVD-ROM discs. The processor and memory may be supplemented by, or incorporated in, special purpose logic circuitry.

Some embodiments described herein are described in the general context of a method or process, which in an embodiment may be implemented by a computer program product embodied in a computer-readable medium, which may include computer-executable instructions (such as program code), which may be executed, for example, by computers in networked environments. The computer readable media may include removable and non-removable storage devices including, but not limited to, a read only memory (ROM), a random access memory (RAM), compact disks (CDs), digital versatile disks (DVD), and the like. Thus, the computer-readable medium can include a non-transitory storage medium. Generally, the program modules may include routines, programs, objects, components, data structures, etc. that perform particular tasks or implement particular abstract data types. The computer or processor executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as a device or module using hardware circuitry, software, or a combination thereof. For example, the hardware circuit implementation may include discrete analog and/or digital components, which may be integrated as part of the printed circuit board, for example. Alternatively or additionally, the disclosed components or modules may be implemented as an ASIC and/or a field programmable gate array (FPGA) devices. Additionally or alternatively, some implementations may include a digital signal processor (DSP) that is a dedicated microprocessor with an architecture optimized for the operational needs of digital signal processing associated with the disclosed functionality of the present application. Similarly, the various components or sub-assemblies within each module may be implemented in software, hardware, or firmware. Any connection method and medium known in the art may be used to provide connections between modules and/or components within modules, including, but not limited to, communication over the Internet, a wired network, or a wireless network using an appropriate protocol.

Although many details are included herein, these should not be construed as limiting the scope of the claimed invention, but rather as describing features specific to particular embodiments. Certain features that are described herein in the context of separate embodiments may also be combined in a single embodiment. Conversely, various features that are described in the context of a single embodiment can also be implemented in multiple embodiments separately or in any suitable subcombination. Furthermore, while the features may be described above as acting in certain combinations and even initially claimed, one or more features from a claimed combination may in some cases be excised from the combination, and the claimed combination may be directed to a subcombination or variation of a subcombination. Similarly, while the operations are depicted in the drawings in a particular order, this should not be understood as requiring that such operations be performed in the particular order shown or in a sequential order, or that all illustrated operations be performed, to achieve desired results.

What is claimed is:

1. A method for predicting a collision time based on an image, comprising:

obtaining a first image and a second image, wherein the first image comprises a first bounding box corresponding to a target object, the second image comprises a second bounding box corresponding to the target object;

calculating a reference scale proportion between the first bounding box and the second bounding box;

generating a plurality of scale proportions associated with the reference scale proportion;

for each of the plurality of scale proportions:

scaling the second bounding box according to the scale proportion to obtain a third bounding box;

extracting a first image block from the first image according to the third bounding box;

extracting a second image block from the second image from according to the second bounding box; and calculating a similarity between the first image block and the second image block;

screening out at least one scale proportion from the plurality of scale proportions according to the similarities; and calculating a predicted value of the collision time with the target object according to the at least one scale proportion.

2. The method according to claim 1, wherein the similarity between the first image block and the second image block comprises at least one of:

a mean squared error of pixel values between the first image block and the second image block;

a structural similarity index of the first image block and the second image block;

a normalized cross-correlation value of the first image block and the second image block; or a Manhattan distance of the first image block from the second image block.

3. The method according to claim 1, wherein the screening out at least one scale proportion from the plurality of scale proportions according to the similarities comprises screening out, from the plurality of scale proportions, at least one scale proportion corresponding to at least one maximum similarity.

4. The method according to claim 1, wherein the calculating the predicted value of the collision time with the target object according to the at least one scale proportion comprises:

performing a first weighted average operation on collision time values calculated based on the at least one scale proportion to obtain the predicted value of the collision time.

5. The method according to claim 1, wherein the calculating the predicted value of the collision time with the target object according to the at least one scale proportion comprises:

performing a second weighted average operation on the at least one scale proportion to obtain a weighted average scale proportion; and calculating the predicted value of the collision time according to the weighted average scale proportion.

6. The method according to claim 1, wherein the generating the plurality of scale proportions associated with the reference scale proportion comprises:

generating the plurality of scale proportions according to the reference scale proportion and a parameter range associated with the reference scale proportion.

7. The method according to claim 1, wherein the generating the plurality of scale proportions according to the reference scale proportion comprises:

calculating a minimum scale proportion and a maximum scale proportion according to the reference scale proportion and a parameter range; and generating the plurality of scale proportions within a range of the minimum scale proportion and the maximum scale proportion.

8. The method according to claim 6, further comprising setting the parameter range according to a distance from the target object to an image acquisition device for collecting the first image and the second image.

9. The method according to claim 1, wherein the reference scale proportion comprises at least one of a width proportion and a height proportion between the first bounding box and the second bounding box.

10. The method according to claim 1, wherein each of the plurality of scale proportions comprises at least one of a width proportion and a height proportion associated with the reference scale proportion;

wherein scaling the second bounding box according to the scale proportion to obtain the third bounding box comprises:

scaling the second bounding box according to the at least one of width proportion and the height proportion in the scale proportion.

11. The method according to claim 1, wherein extracting the first image block from the first image according to the third bounding box comprises:

extracting the first image block from the first image by the third bounding box based on the central position of the first bounding box.

12. The method according to claim 1, wherein extracting the first image block from the first image according to the third bounding box comprises:

extracting a central image block from the first image by the third bounding box based on the central position of the first bounding box;

adjusting the central position of the first bounding box to at least one other position on the first image;

for each other position, extracting other image blocks from the first image by the third bounding box to obtain at least one other image block; and calculating a similarity between the central image block and the at least one other image block respectively with the second image block; and screening from the central image block and the at least one other image block to obtain the first image block according to the similarities.

13. The method according to claim 12, wherein the screening from the central image block and the at least one other image block to obtain the first image block according to the similarities comprises:

selecting, from the central image block or the at least one other image block, a image block corresponding to a maximum similarity as the first image block.

14. The method according to claim 1, further comprising adjusting a size of the first image block to be the same as that of the second image block.

15. A computing device, comprising:

one or more processors; and a memory storing a program comprising instructions which, when executed by the processor, cause the computing device to perform a method comprising:

obtaining a first image and a second image, wherein the first image comprises a first bounding box corresponding to a target object, the second image comprises a second bounding box corresponding to the target object;

calculating a reference scale proportion between the first bounding box and the second bounding box; generating a plurality of scale proportions associated with the reference scale proportion;

for each of the plurality of scale proportions:

scaling the second bounding box according to the scale proportion to obtain a third bounding box;

extracting a first image block from the first image according to the third bounding box;

extracting a second image block from the second image according to the second bounding box; and calculating a similarity between the first image block and the second image block;

screening out at least one scale proportion from the plurality of scale proportions according to the similarities; and calculating a predicted value of the collision time with the target object according to the at least one scale proportion.

16. The computing device according to claim 15, wherein the similarity between the first image block and the second image block comprises at least one of:

a mean squared error of pixel values between the first image block and the second image block;

a structural similarity index of the first image block and the second image block;

a normalized cross-correlation value of the first image block and the second image block; or a Manhattan distance of the first image block from the second image block.

17. The computing device according to claim 15, wherein the calculating the predicted value of the collision time with the target object according to the at least one scale proportion comprises:

performing a first weighted average operation on collision time values calculated based on the at least one scale proportion to obtain the predicted value of the collision time.

18. The computing device according to claim 15, wherein the calculating the predicted value of the collision time with the target object according to the at least one scale proportion comprises:

performing a second weighted average operation on the at least one scale proportion to obtain a weighted average scale proportion; and calculating the predicted value of the collision time according to the weighted average scale proportion.

19. A non-transitory computer-readable storage medium having a program stored thereon, wherein the program comprises instructions which, when executed by one or more processors of a computing device, cause the computing device to perform a method comprising:

obtaining a first image and a second image, wherein the first image comprises a first bounding box corresponding to a target object, the second image comprises a second bounding box corresponding to the target object;

calculating a reference scale proportion between the first bounding box and the second bounding box; generating a plurality of scale proportions associated with the reference scale proportion;

for each of the plurality of scale proportions:

scaling the second bounding box according to the scale proportion to obtain a third bounding box;

extracting a first image block from the first image according to the third bounding box;

extracting a second image block from the second image according to the second bounding box; and calculating a similarity between the first image block and the second image block;

screening out at least one scale proportion from the plurality of scale proportions according to the similarities; and calculating a predicted value of the collision time with the target object according to the at least one scale proportion.

20. The non-transitory computer-readable storage medium according to claim 19, wherein the generating the plurality of scale proportions associated with the reference scale proportion comprises:

calculating a minimum scale proportion and a maximum scale proportion according to the reference scale proportion and a parameter range; and generating the plurality of scale proportions within a range of the minimum scale proportion and the maximum scale proportion.

* * * * *